United States Patent [19]

Blume et al.

[11] 4,208,382

[45] Jun. 17, 1980

[54] REMOVING H$_2$S FROM GAS WITH RECYCLED NMP EXTRACTION SOLVENT

[75] Inventors: John H. Blume, Chester; James D. Bushnell, Berkeley Heights; Milton D. Leighton, Florham Park, all of N.J.

[73] Assignee: Exxon Research & Engineering Co., Florham Park, N.J.

[21] Appl. No.: 973,680

[22] Filed: Dec. 27, 1978

[51] Int. Cl.$^2$ .............................................. B01D 53/34
[52] U.S. Cl. ................................... 423/210; 423/226; 55/73; 208/326
[58] Field of Search ............... 423/226, 228, 229, 232, 423/233, 220; 55/68, 73; 208/326

[56] References Cited

U.S. PATENT DOCUMENTS

| | | | |
|---|---|---|---|
| 3,120,993 | 2/1964 | Thormann et al. | 423/226 |
| 3,245,752 | 4/1966 | Fryar et al. | 423/229 |
| 3,324,627 | 6/1967 | Kohrt | 55/32 |
| 3,492,788 | 2/1970 | Hochgesand et al. | 55/48 |
| 3,656,275 | 4/1972 | Hunter | 55/73 |
| 4,057,491 | 11/1977 | Bushnell et al. | 208/326 |

FOREIGN PATENT DOCUMENTS

| | | | |
|---|---|---|---|
| 314860 | 1/1930 | United Kingdom | 423/233 |
| 1153786 | 5/1969 | United Kingdom | 423/226 |

*Primary Examiner*—Earl C. Thomas

*Attorney, Agent, or Firm*—E. M. Corcoran; Joseph J. Allocca

[57] ABSTRACT

An improved process for removing H$_2$S from a hydrofiner tail gas wherein said tail gas is passed into a scrubbing zone wherein it is contacted with liquid NMP to remove most of the H$_2$S from the gas to form an H$_2$S-rich NMP solution and the H$_2$S-rich NMP solution is heated and passed into a stripping zone to remove most of the H$_2$S from the NMP to form an H$_2$S-lean NMP solution, extracting a hydrocarbon oil with an NMP solution, recovering hot liquid, NMP from said extracted oil and combining it with said H$_2$S-lean NMP solution and wherein said combined solution comprises at least a portion of said NMP solution used to extract said oil, wherein the improvement comprises heating the H$_2$S-rich NMP solution to the required stripping temperature by indirectly contacting same, in heat exchange relationship, with at least a portion of said combined NMP solution.

This process is especially useful for scrubbing H$_2$S from hydrofiner tail gas for use as once-through stripping gas in the solvent recovery section of a lube oil extraction process employing NMP as the extraction solvent, and in a preferred embodiment, the spent stripping gas from the lube oil solvent recovery is used as the stripping gas in the stripping zone of this invention.

8 Claims, 1 Drawing Figure

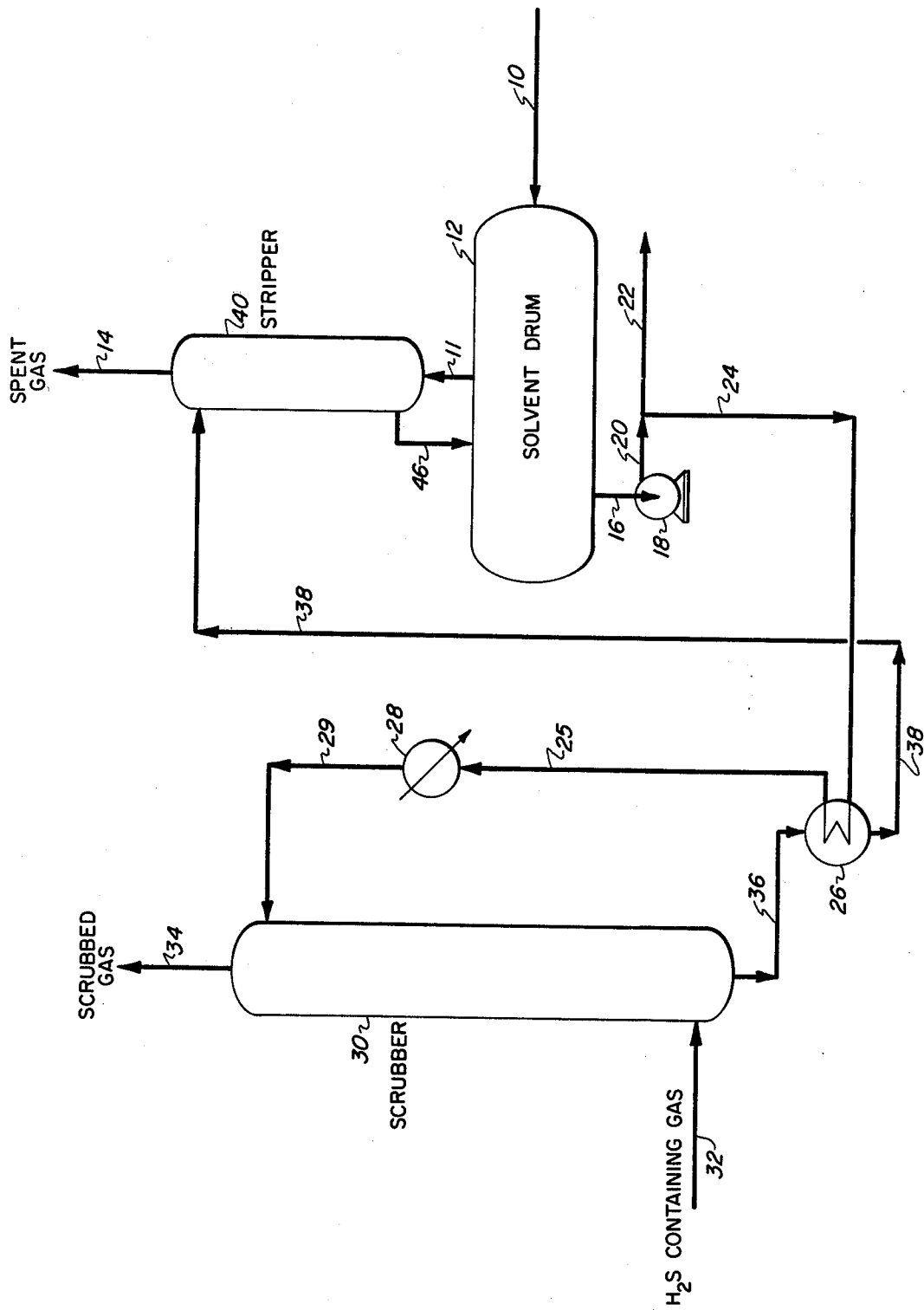

REMOVING H₂S FROM GAS WITH RECYCLED NMP EXTRACTION SOLVENT

BACKGROUND OF THE INVENTION

1. Field of the Invention

This invention relates to a process for removing $H_2S$ from a gas using NMP. More particularly, this invention relates to an improved process for scrubbing $H_2S$ from a gas with NMP to form an $H_2S$-rich solution which is then heated and sent to a stripping zone to remove the $H_2S$ from the NMP wherein the improvement comprises using hot NMP recovered from extracted hydrocarbon oil to heat the $H_2S$-rich NMP solution before same is sent to said stripping zone. Still more particularly, in a process for removing $H_2S$ from a hydrofiner tail gas wherein said $H_2S$-containing gas is passed into a scrubbing zone wherein it is contacted with liquid NMP to remove most of the $H_2S$ from the gas to form an $H_2S$-rich NMP solution, heating said $H_2S$-rich NMP solution and passing said hot solution to a stripping zone to remove most of the $H_2S$ from the NMP to form an $H_2S$-lean NMP solution extracting a hydrocarbon oil with said $H_2S$-lean NMP solution and recovering hot NMP from said hot extracted oil, the improvement which comprises heating said $H_2S$-rich NMP solution to the temperature required for stripping same by indirectly contacting same, in heat exchange relationship, with at least a portion of said hot, liquid NMP recovered from said extracted oil.

2. Description of the Prior Art

It is known to use NMP to scrub or absorb $H_2S$ from various $H_2S$-containing gas streams thereby forming an $H_2S$-rich NMP solution. It is known to regenerate the NMP by heating up the $H_2S$-rich NMP solution and stripping off the $H_2S$ in a stripping zone, cooling the so-regenerated NMP and recycling it back into the scrubber. It is also known in the art to use NMP for hydrocarbon extraction processes such as the BTX process for separating paraffins from gasoline fractions and for lube oil extraction processes. In all of the hydrocarbon extraction processes employing NMP as the extraction solvent, it is economically necessary to recover the solvent. This is generally done by a combination of flash evaporation and distillation, with gas stripping used to remove residual amounts of NMP from the extracted hydrocarbon. The solvent-free hydrocarbon is then often sent to a hydrofiner for final purification by contact with hydrogen and a catalyst wherein polar compounds containing sulfur, nitrogen and oxygen, as well as color bodies, and unstable compounds, etc., are removed. The gas exiting from a hydrofiner is generally relatively rich in hydrogen. By way of illustrative, but non-limiting example, a typical tail gas from a lube oil hydrofiner will comprise about 71% mole hydrogen, 13% methane, 5% ethane, 5% $C_3^+$ alkanes and 6% $H_2S$. Thus, it can be seen that this gas contains considerable quantities of $H_2S$. This gas may be used again in another hydrofiner in order to consume more of the hydrogen or it may be sent directly to a scrubber in another part of the refinery to remove the $H_2S$ by scrubbing with an amine such as MEA. The $H_2S$ is then sent to a sulfur recovery plant and the scrubbed gas can be used as fuel or for other purposes.

It would be advantageous to use this $H_2S$-containing tail gas for gas stripping in a lube oil or other extraction solvent recovery system on a once-through basis and ultimately use the spent gas from the solvent recovery system as fuel in the solvent recovery furnaces. However, in order to accomplish this, the $H_2S$ must be removed from the gas prior to its use in the solvent stripping operation in order to avoid excessive metal corrosion in the solvent recovery system.

It is undesirable to scrub the gas with caustic soda solution, because the high levels of hydrogen sulfide in the gas would require excessive quantities of caustic and also because of the pollution problem caused by the disposal of large amounts of spent caustic. Scrubbing the gas with MEA, DEA or Catacarb is feasible, but this would introduce a whole new system of scrubbing and regeneration, pumps, solution storage, filters, etc., as well as introducing potential NMP solvent contamination to the $H_2S$ extraction process. Therefore, it would be advantageous if a way could be found to strip hydrogen sulfide from these gases in an economical manner and in a way such that the $H_2S$ gas scrubbing and NMP regeneration process is integrated with the solvent recovery operation or section of an NMP solvent extraction process, particularly if a way could be found to do this without having to introduce any additional energy or contaminants in the system which is required as taught by the prior art.

SUMMARY OF THE INVENTION

What has now been found is in a process for removing $H_2S$ from an $H_2S$-containing gas stream comprising passing said gas stream into a scrubbing zone wherein it is contacted with liquid NMP to remove most of said $H_2S$ from said gas stream to form an $H_2S$-rich NMP solution, heating said $H_2S$-rich NMP solution and passing said hot solution to a gas stripping zone to remove most of the $H_2S$ from said solution to form an $H_2S$-lean NMP solution, extracting a hydrocarbon oil with an NMP solution recovering hot, liquid NMP from said extracted oil and combining it with said $H_2S$-lean NMP solution and wherein said combined solution comprises at least a portion of said NMP solution used to extract said oil, the improvement which comprises heating said $H_2S$-rich NMP solution to the temperature required for stripping same by indirectly contacting same, in heat exchange relationship, with at least a portion of said hot, liquid combined NMP solution.

The NMP solvent (N-methyl-2-pyrrolidone) may contain minor amounts of water ranging from about 0.1 up to 10 wt. % or more and may also contain minor amounts (i.e., 0.1 to 10 wt. %) of other components such as the extracted hydrocarbon oil. The gas may be any nonaqueous, $H_2S$-containing gas that is relatively inert with respect to the NMP. The gas to be scrubbed will generally contain from about 0.5 to 15 volume % $H_2S$ and may come from any source. However, in a preferred embodiment the gas will be a tail gas from a hydrofiner. In a particularly preferred embodiment of this invention, the process of this invention will be integrated with a lube oil extraction process employing NMP as the extraction solvent and using gas stripping in the solvent recovery section of the extraction process, wherein tail gas from a hydrofiner, containing excessive amounts of $H_2S$, is scrubbed with NMP recovered from the lube oil extraction process. The scrubbed tail gas is then used as once-through stripping gas in the lube oil extraction process solvent recovery operation, with at least a portion of said spent stripping gas passed through the stripping zone of the process of this invention to strip $H_2S$ from the $H_2S$-rich NMP solution.

BRIEF DESCRIPTION OF THE DRAWINGS

The attached drawing is a flow diagram of a preferred embodiment of an $H_2S$ scrubbing process employing the improvement of the instant invention.

DETAILED DESCRIPTION

Referring to the drawing, a mixture of stripping gas and condensed NMP solvent at a temperature ranging from about 300° to 400° F. and a pressure ranging from about 25 to 75 psig, obtained from the solvent recovery section (not shown) of a lube oil extraction plant employing NMP as the extraction solvent and wherein said solvent recovery includes gas stripping, is passed via line 10 to solvent drum 12 wherein the spent stripping gas is disengaged from the hot NMP. At least a portion of the disengaged stripping gas is passed to low pressure stripping zone 40 via line 11 and then sent via line 14 to a gas cooler and flash zone and then to a furnace wherein it is burned as fuel. The hot NMP is passed via line 16 to pump 18 wherein it is pumped up to a pressure ranging from about 200 to 300 psig and more preferably from about 200 to 250 psig and passed into line 20. Most of the hot solvent is then passed to a lube oil extraction tower (not shown) via line 22 while a slip stream comprising from about 5 to 15 wt. % of the total solvent coming from pump 18 is withdrawn via line 24 and passed through heat exchanger 26 wherein the hot NMP heats up an $H_2S$-rich NMP solution taken from the bottom of scrubbing zone 30. As a result of passing through heat exchanger 26 the NMP is cooled to a temperature ranging from about 100° to 200° F. and is then passed through exchanger 28 via line 25 wherein it is cooled down to a temperature ranging from about 90 to 150 and more preferably from about 100° to 125° F. The cool NMP is then passed via line 29 into the top of scrubbing zone 30 which is a simple absorption column and may be provided with either packing or trays. The relatively cool NMP passes down through scrubbing zone 30 wherein it countercurrently contacts the gas to be used for stripping NMP from the extracted oil. This gas is a hydrofiner tail gas containing from about 0.5 to 15 volume % $H_2S$ and is passed into the bottom of scrubbing zone 30 via line 32. In scrubbing zone 30, the NMP absorbs most of the $H_2S$ from the gas to produce a scrubbed gas of low $H_2S$ content (i.e., from about 10 to 2,000 ppm) and an $H_2S$-rich NMP solution which is removed from the bottom of zone 30 via line 36. The scrubbed gas at a temperature ranging from about 75° to 200° F. and at a pressure of from about 100 to 300 psig, is passed via line 34 to the solvent recovery section (not shown) of the lube oil extraction plant wherein it is used to strip residual amounts of NMP from the extracted oil. If complete removal of the $H_2S$ is desired, the scrubbed gas may first be sent to further clean-up by known methods such as caustic scrubbing or zinc oxide treatments. The NMP passing down through scrubbing zone 30 is heated up to a very minor degree by the heat of absorption of the $H_2S$. The $H_2S$-rich NMP solution containing up to about 5 wt. % $H_2S$ is taken from the bottom of zone 30 and passed to heat exchanger 26 via line 36. In heat exchanger 26 the $H_2S$-rich NMP solution is heated up to a temperature of from about 275° to 340° F. and more preferably from about 300° to 330° F. and passed to stripping zone 40 via line 38 wherein it countercurrently contacts stripping gas introduced into zone 40 via line 11.

The $H_2S$ is stripped out of solution as gas and removed from zone 40 via line 14 mixed with the stripping gas and then sent to a cool flash zone to condense and remove any NMP present in the gas. The $H_2S$-reduced NMP solution containing less than about 0.001 wt. % and more preferably less than about 0.0005 wt. % $H_2S$ flows out of the bottom of zone 40 into solvent drum 12 via line 46 wherein it is combined with the condensed extraction solvent entering therein via line 10. The combined mixture is removed from drum 12 via line 16 and recycled back to both the extraction zone and the $H_2S$ gas scrubbing zone. The NMP-containing stripping gas exiting zone 40 via line 14 after going to cool flash zone to condense and remove NMP and water present in the hot gas is then sent to lube oil extraction furnaces (not shown) wherein it is burned as fuel. The invention is further illustrated by reference to the following example.

EXAMPLE

Referring to the FIGURE, a combined stream of spent stripping gas comprising hydrogen and light hydrocarbon vapors, along with condensed NMP solvent containing about 3.8 wt. % water and 1.0 wt. % oil, at a temperature of 350° F. and a pressure of 40 psig, is passed from the solvent recovery section (not shown) of a lube oil extraction plant employing NMP as the extraction solvent via line 10 into dry solvent surge drum 12 wherein the spent stripping gas disengages from the solvent solution and passes, via line 11, into the bottom of stripping zone 40 wherein it countercurrently contacts an $H_2S$-rich NMP solution in stripping zone 40 to strip most of the $H_2S$ out of said solution, with the stripped NMP being passed to drum 12 via line 46 as $H_2S$-lean NMP. In zone 40, each mole of liquid $H_2S$-rich NMP contacts 2 moles of stripping gas. Drum 12 is at a temperature and pressure of 350° F. and 40 psig, respectively and the spent stripping gas leaving the drum and entering stripping zone 40, via line 11, contains an equilibrium amount of gaseous NMP and water, which is determined by the conditions in drum 12. Hot NMP solution is withdrawn from drum 12 via line 16 wherein it passes through pump 18 and is pumped up to a pressure of 235 psig and recycled back to the lube oil extraction tower (not shown) via lines 20 and 22. About 6.9 wt. % of the NMP passing through line 20 is withdrawn via line 24 and passed through heat exchanger 26 wherein it is cooled to 135° F. and from there via line 25 to heat exchanger 28 wherein it is further cooled to 100° F. The cool NMP solution at 100° F. and 180 psig is passed via line 29 to the top of scrubbing tower 30 which is provided with packing or trays. Tower 30 operates at a pressure of 180 psig and 100° F. Tail gas from a hydrofiner at a temperature of 95° F. and a pressure of 180 psig comprising mostly hydrogen along with minor amounts of light hydrocarbon vapors and containing 5 wt. % $H_2S$ is passed into scrubber 30 via line 32 wherein it countercurrently contacts the cool NMP. The ratio of NMP to gas is about 1 to 1 on a molar basis. The NMP scrubs most of the $H_2S$ from the tail gas to produce a scrubbed gas having less then 0.1 volume % $H_2S$ which is then removed from the top of scrubber 30 via line 34 and sent to the solvent recovery section (not shown) of the lube oil extraction plant wherein it is used as stripping gas to remove residual amounts of NMP solvent from the extracted lube oil raffinate and extract. The $H_2S$-rich NMP solution is withdrawn from the bottom of scrubber 30 via line 36 and passed to heat exchanger 26 via line 36 wherein it is heated up to 330° F. by the hot NMP withdrawn from dry solvent drum 12 via line 16, pump 18 and lines 20 and 24. The hot, $H_2S$-rich NMP solution, at a temperature of 330° F. and a pressure of about 40 psig, is then passed into stripping zone 40 which operates at a pressure of 40 psig wherein most of the $H_2S$ is removed from the NMP to produce an $H_2S$-reduced NMP solution containing less than about 0.025 wt. % $H_2S$ which is then recycled back to drum 12 via line 46 wherein it is combined with the NMP solution entering said drum via line 10. The combined NMP in drum 12 contains an equilibrium amount of $H_2S$ of about 0.02 wt. %. It should be noted that, in this example, all of the scrubbed tail gas used as stripping gas in the lube oil solvent recovery operation is recovered and passed through zone 40. On exiting zone 40, the $H_2S$-containing gas is cooled and flashed to remove NMP and water from the gas and then sent to lube oil extraction furnaces wherein it is burned as fuel.

What is claimed is:

1. In a process for removing $H_2S$ from an $H_2S$-containing gas stream comprising passing said gas stream into a scrubbing zone wherein it is contacted with liquid NMP to remove most of said $H_2S$ from said gas stream to form an $H_2S$-rich NMP solution, heating said $H_2S$-rich NMP solution, passing said hot solution to a gas stripping zone to remove most of the $H_2S$ from said solution to form an $H_2S$-lean NMP solution, and extracting a hydrocarbon oil with an NMP solution, recovering hot liquid NMP from said extracted oil and combining it with said $H_2S$ lean NMP and wherein said combined solution comprises said hot NMP solution used to extract said oil and said $H_2S$-lean NMP, the improvement which comprises heating said $H_2S$-rich NMP solution to the temperature required for stripping same by indirectly contacting same, in heat exchange relationship, with a portion of said hot, liquid, combined NMP solution employed as the sole heat source.

2. The process of claim 1 wherein said scrubbed gas is used to strip NMP from said extracted oil, the improvement further comprising passing the scrubbed gas, after separation from the NMP, to said gas stripping zone to remove the $H_2S$ from said $H_2S$-rich NMP solution.

3. In a process for removing $H_2S$ from a hydrofiner tail gas comprising passing said tail gas into a scrubbing zone wherein it is contacted with liquid NMP to remove most of said $H_2S$ from said tail gas to form an $H_2S$-rich NMP solution, heating said $H_2S$-rich NMP solution to a stripping temperature and passing said hot solution to a gas stripping zone to remove most of the $H_2S$ from said solution to form an $H_2S$-lean NMP solution, and extracting a lube oil stock with NMP, recovering hot, liquid NMP from the extracted oil and combining it with said $H_2S$-lean NMP and wherein said combined NMP solution is used to extract said lube oil stock, the improvement which comprises heating said $H_2S$-rich NMP solution to said stripping temperature by indirectly contacting same, in heat exchange relationship, with a portion of said combined hot NMP solution as the sole heat source.

4. The process of claim 3 wherein said scrubbed tail gas is used to strip NMP from said extracted oil, the improvement further comprising passing the scrubbed gas, after separation from the NMP, to said gas stripping zone to remove the $H_2S$ from the $H_2S$-rich solution.

5. The process of claim 2 wherein said gas, after removing the $H_2S$ from the $H_2S$-rich solution, is burned as fuel.

6. A process comprising the steps of:
 (a) contacting an $H_2S$-containing gas stream with liquid NMP to remove most of the $H_2S$ from the gas, thereby forming a scrubbed gas and an $H_2S$-rich NMP solution;
 (b) extracting, in an extraction zone, a hydrocarbon oil with NMP;
 (c) stripping said extracted oil with said scrubbed gas, thereby recovering at least a portion of said NMP along with said scrubbed gas;
 (d) heating said $H_2S$-rich NMP solution by indirectly contacting same in heat exchange relationship with a portion of a combined hot NMP solution;
 (e) contacting said hot $H_2S$-rich NMP solution with said scrubbed gas recovered in step (c), above to form an $H_2S$-lean NMP solution;
 (f) combining said $H_2S$-lean NMP solution with said hot NMP recovered in step (c) above to form said combined hot NMP solution; and
 (g) recycling a portion of said combined solution back to said extraction zone.

7. The process of claim 6 wherein said hydrocarbon oil is a lube oil stock.

8. The process of claim 7 wherein said $H_2S$-containing gas is a hydrofiner tail gas.

* * * * *